United States Patent
Harada et al.

(10) Patent No.: US 10,144,823 B2
(45) Date of Patent: Dec. 4, 2018

(54) PHENOLIC RESIN COMPOSITION AND PHENOLIC RESIN CURED PRODUCT

(71) Applicant: SUMITOMO BAKELITE CO., LTD., Tokyo (JP)

(72) Inventors: Naoyuki Harada, Tokyo (JP); Takao Kunimi, Tokyo (JP)

(73) Assignee: SUMITOMO BAKELITE CO., LTD., Tokyo (JP)

( * ) Notice: Subject to any disclaimer, the term of this patent is extended or adjusted under 35 U.S.C. 154(b) by 137 days.

(21) Appl. No.: 15/313,207

(22) PCT Filed: May 27, 2015

(86) PCT No.: PCT/JP2015/065195
§ 371 (c)(1),
(2) Date: Nov. 22, 2016

(87) PCT Pub. No.: WO2015/182640
PCT Pub. Date: Dec. 3, 2015

(65) Prior Publication Data
US 2017/0190900 A1    Jul. 6, 2017

(30) Foreign Application Priority Data

May 30, 2014  (JP) ................................. 2014-112632

(51) Int. Cl.
*C08L 61/06* (2006.01)
*C08K 5/107* (2006.01)
*C08K 5/3477* (2006.01)
*C08L 61/12* (2006.01)

(52) U.S. Cl.
CPC .............. *C08L 61/06* (2013.01); *C08K 5/107* (2013.01); *C08K 5/3477* (2013.01); *C08L 61/12* (2013.01); *C08L 2205/05* (2013.01); *C08L 2312/04* (2013.01)

(58) Field of Classification Search
CPC .. C08L 61/06; C08L 2205/05; C08L 2312/04; C08L 61/00; C08L 61/04; C08L 61/12; C08G 8/10; C08G 8/22
See application file for complete search history.

(56) References Cited

U.S. PATENT DOCUMENTS

2006/0111508 A1    5/2006  Dailey

FOREIGN PATENT DOCUMENTS

| JP | H04185624 A | * | 7/1992 |
| JP | 6-49159 A | | 2/1994 |
| JP | 8-302158 A | | 11/1996 |
| JP | 3237841 B2 | | 12/2001 |
| JP | 2010-235671 A | | 10/2010 |
| JP | 2012-246411 A | | 12/2012 |

OTHER PUBLICATIONS

JPH04185624A English Machine Translation (Year: 2018).*
International Search Report dated Aug. 11, 2015, issued in counterpart application No. PCT/JP2015/065195. (2 pages).

* cited by examiner

*Primary Examiner* — Christopher M Rodd
(74) *Attorney, Agent, or Firm* — Westerman, Hattori, Daniels & Adrian, LLP

(57) ABSTRACT

The phenolic resin composition of the present invention includes a novolac-type phenolic resin, a resorcinol resin, and a curing agent, and is of a solid form. The mixing ratio of the resorcinol resin is preferably more than or equal to 1 part by mass and less than or equal to 100 parts by mass with respect to 100 parts by mass of the novolac-type phenolic resin. The mixing ratio of the curing agent is preferably more than or equal to 5 parts by mass and less than or equal to 25 parts by mass with respect to 100 parts by mass of a total amount of the novolac-type phenolic resin and the resorcinol resin. The phenolic resin cured product is obtained by heat-curing the phenolic resin composition.

9 Claims, No Drawings

PHENOLIC RESIN COMPOSITION AND PHENOLIC RESIN CURED PRODUCT

TECHNICAL FIELD

The present invention relates to a phenolic resin composition and a phenolic resin cured product.

BACKGROUND ART

Phenolic resins have excellent characteristics of heat resistance, mechanical strength, electrical properties, or the like. In particular, a phenolic resin composition using hexamethylenetetramine as a curing agent in a novolac-type phenolic resin has a solid form and therefore has excellent handleability. For these reasons, such a phenolic resin composition is widely used in various applications such as molding materials, laminates, FRP, friction materials, molds, grinding stones, thermal insulating materials, and adhesives.

However, conventional phenolic resin compositions suffer from a problem of a slow curing rate. Therefore, there is a demand to increase the molding speed for the purpose of improving the productivity. To this end, a variety of studies for improvement of curability have been made so far. In such studies, it has been attempted to improve the curability by a method of using a high-ortho novolac-type phenolic resin (for example, see Patent Document 1), a method of mixing an organic acid with a novolac-type phenolic resin and hexamethylenetetramine (for example, see Patent Document 2), or the like. However, it cannot be said that these methods have sufficient improving effects on curability, and there may also be a case/where curability does not necessarily contribute to an actual molding speed, so further improvements in molding speed are desired.

RELATED DOCUMENTS

Patent Documents

[Patent Document 1] Japanese Laid-open Patent Publication No. 08-302158
[Patent Document 2] Japanese Laid-open Patent Publication No. 06-049159

SUMMARY OF THE INVENTION

An object of the present invention is to provide a phenolic resin composition having excellent molding speed and mechanical properties and a phenolic resin cured product.

Such an object is achieved by the present inventions (1) to (10) described below.

(1) A phenolic resin composition comprising a novolac-type phenolic resin, a resorcinol resin, and a curing agent, wherein the phenolic resin composition is in the form of a solid.

(2) The phenolic resin composition according to (1), in which the curing agent includes hexamethylenetetramine.

(3) The phenolic resin composition according to (1) or (2), in which the resorcinol resin has a number-average molecular weight of more than or equal to 150 and less than or equal to 10000.

(4) The phenolic resin composition according to any one of (1) to (3), in which the mixing ratio of the resorcinol resin is more than or equal to 1 part by mass and less than or equal to 100 parts by mass with respect to 100 parts by mass of the novolac-type phenolic resin.

(5) The phenolic resin composition according to any one of (1) to (4), in which the mixing ratio of the curing agent is more than or equal to 5 parts by mass and less than or equal to 25 parts by mass with respect to 100 parts by mass of a total amount of the novolac-type phenolic resin and the resorcinol resin.

(6) The phenolic resin composition according to any one of (1) to (5), in which, when the phenolic resin composition is subjected to compression-molding under the conditions of a temperature of 180° C., a curing time of 3 minutes, and a pressure of 10 MPa, and then subjected to post-curing under the condition of a temperature of 180° C. for 8 hours to give a cured product having a thickness of 4 mm, the cured product has a bending strength measured under a 25° C. atmosphere in accordance with JIS K 6911, of more than or equal to 100 MPa and less than or equal to 300 MPa.

(7) The phenolic resin composition according to any one of (1) to (6), in which, when the phenolic resin composition is subjected to compression-molding under the conditions of a temperature of 180° C., a curing time of 3 minutes, and a pressure of 10 MPa, and then subjected to post-curing under the condition of a temperature of 180° C. for 8 hours to give a cured product having a thickness of 4 mm, and the cured product is subjected to a heat treatment test at 240° C. for 100 hours, the variation of bending strength calculated by $100 \times (R_1 - R_2)/R_1$ is 35% or less, wherein the bending strength of a sheet of the cured product prior to the heat treatment test, as measured in a 25° C. atmosphere in accordance with JIS K 6911, is defined as $R_1$, and the bending strength of the sheet of the cured product after the heat treatment test, as measured in a 25° C. atmosphere in accordance with JIS K 6911, is defined as $R_2$.

(8) The phenolic resin composition according to any one of (1) to (7), in which the resorcinol resin is a novolac-type resorcinol resin.

(9) The phenolic resin composition according to any one of (1) to (8), in which the phenolic resin composition has a melting point of higher than or equal to 50° C. and lower than or equal to 150° C.

(10) A phenolic resin cured product obtained by heat-curing the phenolic resin composition according to any one of (1) to (9).

According to the present invention, it is possible to obtain a phenolic resin composition which can be suitably used for various applications, due to having particularly excellent molding speed and also excellent mechanical properties.

DESCRIPTION OF EMBODIMENTS

The phenolic resin composition and phenolic resin cured product of the present embodiment will be described. The phenolic resin composition of the present embodiment includes a novolac-type phenolic resin, a resorcinol resin, and a curing agent, and is of a solid form. By mixing a resorcinol resin and a curing agent with a novolac-type phenolic resin, it is possible to effectively accelerate the curing reaction between the curing agent and the novolac-type phenolic resin. Further, due to being of a solid form, the phenolic resin composition of the present embodiment exhibits excellent handleability and therefore can be used for a wide range of applications. Therefore, since the molding speed of the phenolic resin composition is excellent, it is possible to shorten the molding time of a product when used in various applications.

From the viewpoint of being a solid form, the phenolic resin composition of the present embodiment has a melting point of preferably 50° C. or higher, more preferably 55° C. or higher, and particularly preferably 60° C. or higher. This makes it possible to ensure that handleability in a state of a solid form is excellent. In a case where the melting point is higher than or equal to the above-specified lower limit value, it is possible to prevent occurrence of blocking or the like during storage, thus allowing handleability to be improved. Further, the phenolic resin composition of the present embodiment has a melting point of preferably 150° C. or lower, more preferably 130° C. or lower, and particularly preferably 120° C. or lower, from the viewpoint of curability. Thus, since the curing reaction starts at a relatively low temperature, it is possible to enhance the curability. In a case where the melting point is lower than or equal to the above-specified upper limit value, the time until onset of melting in a mold at a time of molding becomes shorter, so it is possible to make the molding speed more favorable.

The novolac-type phenolic resin used, in the phenolic resin composition of the present embodiment is not particularly limited, and examples thereof include a phenol novolac-type resin, a cresol novolac-type resin, a cresol-modified novolac-type resin, a xylenol novolac-type resin, a xylenol-modified novolac-type resin, an alkyl novolac-type phenolic resin, an alkyl-modified novolac-type phenolic resin, a naphthol novolac-type resin, a naphthol-modified novolac-type resin, a bisphenol A novolac-type resin, a bisphenol A-modified novolac-type resin, a phenolaralkyl novolac-type resin, a phenolaralkyl-modified novolac-type resin, a phenoldiphenylaralkyl novolac-type resin, a phenoldiphenylaralkyl-modified novolac-type resin, a phenolnaphthalene novolac-type resin, a phenol naphthalene-modified novolac-type resin, a phenoldicyclopentadiene novolac-type resin, a phenoldicyclopentadiene-modified novolac-type resin, and a cashew nut oil-, terpene-, tall oil-, rosin-, phenoxy resin- or xylene resin-modified novolac-type phenolic resin. Preferred are a phenol novolac-type resin, a cresol novolac-type resin, a cresol-modified novolac-type resin, an alkyl novolac-type phenolic resin, an alkyl-modified novolac-type phenolic resin, a bisphenol A novolac-type resin, a bisphenol A-modified novolac-type resin, a phenolaralkyl novolac-type resin, a phenolaralkyl-modified novolac-type resin, a cashew nut oil-modified novolac-type phenolic resin, a phenoxy resin-modified novolac-type resin, a tall oil-modified novolac-type resin, and a xylene resin-modified novolac-type resin. These resins may be used alone or in combination of two or more thereof.

The resorcinol resin used in the phenolic resin composition of the present embodiment can be obtained as a condensation product of resorcinol monomers and aldehydes which will be described hereinafter. Examples of the aldehydes used in the resorcinol resin include aldehydes such as formaldehyde, paraformaldehyde, polyacetal, trioxane, acetaldehyde, paraldehyde, butyraldehyde, crotonaldehyde and acrolein, and mixtures thereof. In addition, substances serving as a source of these aldehydes, or solutions of these aldehydes may also be used. The synthetic method of a resorcinol resin is not particularly limited. For example, with respect to synthesis, a resorcinol resin can be obtained by a method of mixing and heating resorcinol monomers and aldehydes, or a method of reacting resorcinol monomers and aldehydes at room temperature or under heating using an acid or basic catalyst. In addition, any one of a novolac-type resorcinol resin and a resol-type resorcinol resin may also be used as the resorcinol resin. Preferred is a resorcinol resin which contains a novolac-type resorcinol resin from the viewpoint of small change with time, and particularly preferred is a novolac-type resorcinol resin which contains a condensation product of resorcinol-formaldehyde from the viewpoint of cost and molding speed.

The above-mentioned resorcinol monomers are not particularly limited, and examples thereof include resorcinol, methylresorcinols such as 2-methylresorcinol, 5-methylresorcinol, and 2,5-dimethylresorcinol, 4-ethylresorcinol, 4-chlororesorcinol, 2-nitroresorcinol, 4-bromoresorcinol, and 4-n-hexylresorcinol. These resorcinols may be used alone or in combination of two or more thereof. Among these, a preferred one is selected from resorcinol and methylresorcinols, from the viewpoint of cost and moldability.

The number average molecular weight of the resorcinol resin is not particularly limited, but it is preferably more than or equal to 150 and less than or equal to 10000. The number-average molecular weight can be determined from a number-average molecular weight in terms of polystyrene as measured by gel permeation chromatography (GPC). The number-average molecular weight of the resorcinol resin is more preferably more than or equal to 200 and less than or equal to 5000, and particularly preferably more than or equal to 300 and less than or equal to 3000. Thus, it is possible to obtain a phenolic resin composition having an excellent molding speed. By setting the number-average molecular weight to be more than or equal to the above-specified lower limit value, it is possible to further increase not only curability, but also molding speed due to strength of a molded product during molding being increased. In a case where the number-average molecular weight is less than or equal to the above-specified upper limit value, fluidity is further improved and molding speed becomes better.

In the synthesis of the novolac-type resorcinol resin used in the phenolic resin composition of the present embodiment, the reaction molar ratio of aldehydes to resorcinols is not particularly limited, but it is preferably set to be more than or equal to 0.20 mol and less than or equal to 1.5 mol of aldehydes with respect to 1 mol of resorcinol. More preferably, there is more than or equal to 0.3 mol and less than or equal to 0.9 mol of aldehydes. If the molar ratio is more than or equal to the lower limit value, handling of the resin is easy. If the molar ratio is less than or equal to the upper limit value, the reaction control becomes easy.

The mixing ratio of the resorcinol resin is preferably more than or equal to 1 part by mass and less than or equal to 100 parts by mass with respect to 100 parts by mass of the novolac-type phenolic resin. More preferred is more than or equal to 2 parts by mass and less than or equal to 80 parts by mass, still more preferred is more than or equal to 3 parts by mass to and less than or equal to 50 parts by mass, and particularly preferred is more than or equal to 5 parts by mass and less than or equal to 40 parts by mass. Thus, it is possible to obtain a phenolic resin composition exhibiting excellent curability. By setting the mixing ratio of the resorcinol resin to be more than or equal to the above-specified lower limit value, an accelerating effect of the curing reaction is further improved, and it is possible to stake the molding speed better. In addition, by setting the mixing ratio of the resorcinol resin to be less than or equal to the above-specified upper limit value, the crosslinking density is increased, thus allowing physical properties of a molded product to be improved. Therefore, deformation of the molded product is further less likely to occur, and therefore it is possible to make the molding speed more favorable.

The mixing ratio of the curing agent used in the phenolic resin composition of the present embodiment is not particularly limited, but it is preferably more than or equal to 5 parts by mass and less than or equal to 25 parts by mass with respect to 100 parts by mass of a total amount of the novolac-type phenolic resin and the resorcinol resin. More preferred is more than or equal to 6 parts by mass and less than or equal to 20 parts by mass, and particularly preferred is more than or equal to 7 parts by mass and less than or equal to 18 parts by mass. Accordingly, it is possible to obtain a molded product having excellent physical properties while achieving rapid molding speed. By setting the mixing ratio of the curing agent to be more than or equal to the above-specified lower limit value, the cross linking density is increased, thus allowing physical properties of a molded product to be improved. By setting the mixing ratio of the curing agent to be less than or equal to the above-specified upper limit value, the generation of curing gases derived from the curing agent can be further inhibited, and therefore it is possible to further inhibit imperfect molding due to gases.

Examples of the curing agent used in the phenolic resin composition of the present embodiment include one or more selected from amine-based aldehyde sources such as hexamethylenetetramine, an adduct of hexamethylenetetramine with a phenol derivative, and hexamethoxymethylolmelamine, or aldehyde sources such as paraformaldehyde, and polyacetal resins. Among these, hexamethylenetetramine is preferred due to excellent curability.

Various fillers may be mixed into the phenolic resin composition of the present embodiment. The various fillers are not particularly limited, and examples thereof include inorganic powder fillers such as silica, alumina, magnesia, carbon, silicon carbide, boron nitride, aluminum nitride, silicon nitride, calcium carbonate, barium carbonate, calcium sulfate, barium sulfate, clay, talc, mica, magnesium hydroxide, aluminum hydroxide, wollastonite, and metal powder, and reinforcing fibers such as glass fibers, carbon fibers, aramid fibers, nylon fibers, and metal fibers. These fillers may be used alone or in a combination of two or more thereof. Further, if necessary, one or more selected from a colorant, a releasing agent, a curing catalyst, a curing aid, a coupling agent, a stress-reducing agent, a flame retardant, a solvent, and the like may be appropriately added to the phenolic resin composition of the present embodiment.

The mixing ratio of the filler used in the phenolic resin composition of the present embodiment is not particularly limited, but it is preferably more than or equal to 5 parts by mass and less than or equal to 300 parts by mass with respect to 100 parts by mass of a total amount of the novolac-type phenolic resin, the resorcinol resin and the curing agent. More preferred is more than or equal to 10 parts by mass and less than or equal to 200 parts by mass, and particularly preferred is more than or equal to 20 parts by mass and less than or equal to 150 parts by mass. Thus, it is possible to make mechanical properties of the resulting molded product yet better while achieving a rapid molding speed.

The phenolic resin composition of the present embodiment has a bending strength of preferably more than or equal to 100 MPa and less than or equal to 300 MPa, and more preferably more than or equal to 150 MPa and less than or equal to 250 MPa, as measured by the following measuring method, from the viewpoint of improving mechanical properties of the phenolic resin composition.

(Measuring Method)

The phenolic resin composition of the present embodiment is compression-molded under the conditions of 180° C., a curing time of 3 minutes and 10 MPa, and then post-cured under the conditions of 180° C. and 3 hours to give a cured product having a thickness of 4 mm. Thereafter, the bending strength of this cured product is measured in accordance with JIS K 6911 in a 25° C. atmosphere.

The phenolic resin composition of the present embodiment has a variation of bending strength of preferably 35% or less, more preferably 30% or less, still more preferably 28% or less, and particularly preferably 25% or less, as measured by the following measuring method, from the viewpoint of improving mechanical properties of the phenolic resin composition at a high temperature.

(Measuring Method)

The phenolic resin composition of the present embodiment is compression-molded under the conditions of 180° C., a curing time of 3 minutes and 10 MPa, and then post-cured under the conditions of 180° C. and 8 hours to give a cured product having a thickness of 4 mm. Thereafter, this cured product is subjected to a heat treatment test at 240° C. for 100 hours. When the bending strength of a sheet of the cured product prior to the heat treatment test, as measured in accordance with JIS K 6911 in a 25° C. atmosphere, is defined as $R_1$, and the bending strength of the sheet of the cured product after the heat treatment test, as measured in accordance with JIS K 6911 in a 25° C. atmosphere, is defined as $R_2$, the variation of bending strength is calculated by $100 \times (R_1 - R_2)/R_1$.

The method for obtaining the phenolic resin composition of the present embodiment is not particularly limited. For example, the phenolic resin composition of the present embodiment can be obtained by a method of dry-mixing the formulation in a predetermined mixing ratio using a mixer, a blender or the like, or melt-kneading the formulation in a predetermined mixing ratio using a kneading machine such as a heating roll, a co-kneader or a twin screw extruder, followed by cooling-pulverization or granulation, or a method of mixing the formulation as it is or adding and mixing a solvent or the like into the formulation, using a dry or wet mixer.

The phenolic resin cured product of the present embodiment can be obtained by heat-curing and molding the phenolic resin composition of the present embodiment using a conventional molding method such as compression molding, transfer molding, or injection molding. The resin cured product (molded product) obtained in this manner exhibits excellent strength in spite of a short molding time, and therefore can be applied to a wide variety of applications such as automotives, general-purpose machines, household appliances and their peripheral devices.

Hereinafter, the present invention will be specifically described with reference to the Examples, but the present invention is not intended to be limited to these Examples. Further, "parts" and "%" given in Examples and Comparative Examples refer to "parts by mass" and "mass %", respectively.

The number-average molecular weight (Mn) of the resorcinol resin was measured by gel permeation chromatography (GPC) of tetrahydrofuran (THF) solubles, and calculated in terms of polystyrene.

The GPC measurement conditions are shown below.

Apparatus: HLC-8320 (manufactured by Tosoh Corporation)

Detector: RI

Columns: one series of TSK-GEL G1000H (manufactured by Tosoh Corporation) and two series of TSK-GEL G2000H (manufactured by Tosoh Corporation) were used by connecting those columns in series in that order.

Temperature: 40° C.

Solvent: THF

Flow rate: 1.0 ml/min

Sample: 50 μl of a sample having a concentration of 1 mass % was injected (Synthesis 1 of Resorcinol Resin)

A mixture of 1000 parts of resorcinol and 3 parts of oxalic acid was heated to 100° C., and 400 parts of 37% formalin were added thereto over 30 minutes. Then, the mixture was allowed to react for 1 hour, followed by dehydration by atmospheric distillation until the temperature of the reaction mixture reached to 140° C., further dehydration by distillation under reduced pressure until the temperature of the reaction mixture reached to 180° C. while gradually reducing the pressure up to 0.9 kPa, and demonomerization to give 910 parts of a novolac-type resorcinol resin A. The number-average molecular weight of the resin was 505.

Example 1

100 parts of a novolac-type phenolic resin (manufactured by Sumitomo Bakelite Co., Ltd., PR-53195), 15 parts of a resorcinol resin A, and 15 parts of hexamethylenetetramine (manufactured by Mitsubishi Gas Chemical Company, Inc.) were mixed in a dry mixer equipped with an impact type pulverizer to give a phenolic resin composition A.

Example 2

A phenolic resin composition B was obtained in the same manner as in Example 1, except that 100 parts of a novolac-type phenolic resin, 50 parts of a resorcinol resin A, and 12 parts of hexamethylenetetramine were used.

Example 3

A phenolic resin composition C was obtained in the same manner as in Example 1, except that 100 parts of a novolac-type phenolic resin, 120 parts of a resorcinol resin A, and 20 parts of hexamethylenetetramine were used.

Example 4

A phenolic resin composition D was obtained in the same manner as in Example 1, except that 100 parts of a novolac-type phenolic resin, 15 parts of a resorcinol resin A, and 5 parts of hexamethylenetetramine were used.

Example 5

A phenolic resin composition E was obtained in the same manner as in Example 1, except that 100 parts of a novolac-type phenolic resin, 15 parts of a resorcinol resin A, and 30 parts of hexamethylenetetramine were used.

Example 6

A phenolic resin composition F was obtained in the same manner as in Example 1, except that a cashew nut oil-modified novolac-type phenolic resin (manufactured by Sumitomo Bakelite Co., Ltd., FR-12686E) was used in place of a novolac-type phenolic resin.

Example 7

A phenolic resin composition G was obtained in the same manner as in Example 1, except that a phenolaralkyl novolac-type resin (manufactured by Sumitomo Bakelite Co., Ltd., PR-54869) was used in place of a novolac-type phenolic resin.

Comparative Example 1

A phenolic resin composition H was obtained in the same manner as in Example 1, using 100 parts of a novolac-type phenolic resin and 10 parts of hexamethylenetetramine.

Comparative Example 2

A phenolic resin composition I was obtained in the same manner as in Comparative Example 1, except that a cashew nut oil-modified novolac-type phenolic resin was used in place of a novolac-type phenolic resin.

Comparative Example 3

A phenolic resin composition J was obtained in the same manner as in Comparative Example 1, except that a phenolaralkyl novolac-type resin was used in place of a novolac-type phenolic resin.

Comparative Example 4

A phenolic resin composition K was obtained in the same manner as in Example 1, by adding 100 parts of a novolac-type phenolic resin, 10 parts of hexamethylenetetramine, and 2 parts of salicylic acid.

Comparative Example 5

A phenolic resin composition L was obtained in the same manner as in Example 1, except that resorcinol (manufactured by Sumitomo Chemical Co., Ltd.) was used in place of a resorcinol resin A.

(Evaluation of Shortest Molding Time)

Evaluation of the shortest time for molding of the phenolic resin compositions obtained in Examples and Comparative Examples was conducted in the following manner.

50 parts of a phenolic resin composition and 50 parts of a glass cut fiber (CS3 SK-406, average fiber diameter of 10 μm, manufactured by Nitto Boseki Co., Ltd.) were mixed using a kneader at 90° C. for 5 minutes to give a complex (phenolic resin composition containing a filler). The resulting complex was compression-molded using a metal mold of a bending test piece in accordance with JIS K 6911, "Bending test method for hard plastics" at a temperature of 180° C. and a plane pressure of 10 MPa to thereby obtain a resin cured product. Appearance and deformation of the resin cured product were examined. The shortest molding time at which swelling and deformation do not occur was checked every 5 seconds and used for evaluation as an index of the molding speed.

(Bending Strength)

Measurement of the bending strength of the phenolic resin compositions obtained in Examples and Comparative Examples was conducted in the following manner.

50 parts of a phenolic resin composition and 50 parts of a glass cut fiber (CS3 SK-406, average fiber diameter of 10 μm, manufactured by Nitto Boseki Co., Ltd.) were mixed using a kneader at 90° C. for 5 minutes to give a complex (phenolic resin composition containing a filler). The resulting complex was compression-molded using a metal mold of a bending test piece in accordance with JTS K 6911, "Bending test method for hard plastics" under the conditions of 180° C., a curing time of 3 minutes, and a plane pressure of 10 MPa, followed by post-curing under the conditions of 180° C. and 8 hours to obtain a cured product having a thickness of 4 mm. Then, this cured product sheet was subjected to a heat treatment test at 240° C. for 100 hours. The bending strength of the cured product sheet prior to the heat treatment test, as measured in accordance with JIS K 6911 in 25° C. atmosphere, was defined as $R_1$, and the bending strength of the cured product sheet after the heat treatment test, as measured in accordance with JIS K 6911 in a 25° C. atmosphere, was defined as $R_2$. The variation (%) of bending strength was calculated by $100 \times (R_1 - R_2)/R_1$.

(Melting Point)

Measurement of the melting point of the phenolic resin compositions obtained in Examples and Comparative Examples was performed in accordance with JIS K 0064.

with Comparative Example 1, the shortest molding time becomes shorter in Comparative Example 4, which was aimed to improve the molding speed by addition of an organic acid as generally being performed, whereas Examples 1, 2, 3, 4, and 5 exhibited the molding speed exceeding that of Comparative Example 4. Moreover, Example 6 using a cashew nut oil-modified novolac-type phenolic resin which is said to exhibit poor curability and slow molding speed, and Example 7 using a phenolaralkyl novolac-type resin also exhibited good molding speed, and showed significantly improved molding speed as compared

TABLE 1

|  | Example 1 | Example 2 | Example 3 | Example 4 | Example 5 |
|---|---|---|---|---|---|
| Novolac-type phenolic resin | 100 | 100 | 100 | 100 | 100 |
| Cashew nut oil-modified novolac-type phenolic resin | — | — | — | — | — |
| Phenolaralkyl novolac-type resin | — | — | — | — | — |
| Resorcinol resin A | 15 | 50 | 120 | 15 | 15 |
| Salicylic acid | — | — | — | — | — |
| Hexamethylenetetramine | 15 | 12 | 20 | 5 | 30 |
| Parts of hexamethylenetetramine mixed with respect to 100 parts of mixture of novolac-type phenolic resin and resorcinol-based compound | 13.0 | 8.0 | 9.1 | 4.3 | 26.1 |
| Shortest molding time (seconds) | 45 | 50 | 60 | 60 | 60 |
| Melting pot (° C.) | 90 | 87 | 85 | 89 | 91 |
| Bending strength $R_1$ (MPa) | 201 | 188 | 219 | 158 | 228 |
| Bending strength $R_2$ (MPa) | 155 | 143 | 158 | 112 | 182 |
| Variation (%) of bending strength | 23 | 24 | 28 | 29 | 20 |

TABLE 2

|  | Example 6 | Example 7 | Comparative Example 1 | Comparative Example 2 | Comparative Example 3 | Comparative Example 4 | Comparative Example 5 |
|---|---|---|---|---|---|---|---|
| Novelac-type phenolic resin | — | — | 100 | — | — | 100 | 100 |
| Cashew nut oil-modified novolac-type phenolic resin | 100 | — | — | 100 | — | — | — |
| Phenolaralkyl novolac-type resin | — | 100 | — | — | 100 | — | — |
| Resorcinol resin A | 15 | 15 | — | — | — | — | — |
| Resorcinol | — | — | — | — | — | — | 15 |
| Salicylic acid | — | — | — | — | — | 2 | — |
| Hexamethylenetetramine | 15 | 15 | 10 | 10 | 10 | 10 | 15 |
| Parts of hexamethylenetetramine mixed with respect to 100 parts of mixture of novolac-type phenolic resin and resorcinol-based compound | 13.0 | 13.0 | 10.0 | 10.0 | 10.0 | 10.0 | 13.0 |
| Shortest molding time (seconds) | 60 | 70 | 70 | 90 | 145 | 65 | 50 |
| Melting point (° C.) | 70 | 74 | 92 | 69 | 72 | 90 | 91 |
| Bending strength $R_1$ (MPa) | 162 | 203 | 180 | 152 | 191 | 176 | 198 |
| Bending strength $R_2$ (MPa) | 107 | 175 | 135 | 99 | 162 | 130 | 139 |
| Variation (%) of bending strength | 34 | 14 | 25 | 35 | 15 | 26 | 30 |

As shown in Tables 1 and 2, Examples 1, 2, 3, 4, and 5 exhibited a shorter shortest molding time and better molding speed than Comparative Example 1 not containing a resorcinol resin. In addition, Example 1 exhibited a smaller variation of bending strength and superior mechanical properties than Comparative Example 5 using a resorcinol monomer in place of s resorcinol resin. Further, when compared to Comparative Examples 2 and 3 not containing a resorcinol resin.

As can be seen from these results, the phenolic resin composition of the present embodiment and a cured product obtained thereby have excellent molding speed and mechanical properties and therefore can be suitably used in various applications.

According to the present invention, the phenolic resin composition of the present invention has particularly excellent molding speed and also excellent mechanical properties as compared with a conventional phenolic resin composition, and is therefore capable of reducing a time period of molding and improving the productivity per hour. Consequently, the present phenolic resin composition and phenolic resin cured product can be widely used for various binders and molded products.

This application claims priority based on Japanese Patent Application No. 2014-112632, filed on May 30, 2014, the entire disclosure of which is incorporated herein by reference.

The invention claimed is:

1. A phenolic resin composition comprising a novolac-type phenolic resin, a resorcinol resin, and a curing agent, wherein the phenolic resin composition is in the form of a solid,
   wherein the resorcinol resin has a number-average molecular weight of more than or equal to 150 and less than or equal to 10000.

2. The phenolic resin composition according to claim 1, wherein the curing agent includes hexamethylenetetramine.

3. The phenolic resin composition according to claim 1, wherein the mixing ratio of the resorcinol resin is more than or equal to 1 part by mass and less than or equal to 100 parts by mass with respect to 100 parts by mass of the novolac-type phenolic resin.

4. The phenolic resin composition according to claim 1, wherein the mixing ratio of the curing agent is more than or equal to 5 parts by mass and less than or equal to 25 parts by mass with respect to 100 parts by mass of a total amount of the novolac-type phenolic resin and the resorcinol resin.

5. The phenolic resin composition according to claim 1, wherein, when the phenolic resin composition is subjected to compression-molding under the conditions of a temperature of 180° C., a curing time of 3 minutes, and a pressure of 10 MPa, and then subjected to post-curing under the condition of a temperature of 180° C. for 8 hours to give a cured product having a thickness of 4 mm, the cured product has a bending strength measured under a 25° C. atmosphere in accordance with JIS K 6911, of more than or equal to 100 MPa and less than or equal to 300 MPa.

6. The phenolic resin composition according to claim 1, wherein, when the phenolic resin composition is subjected to compression-molding under the conditions of a temperature of 180° C., a curing time of 3 minutes, and a pressure of 10 MPa, and then subjected to post-curing under the condition of a temperature of 180° C. for 8 hours to give a cured product having a thickness of 4 mm, and the cured product is subjected to a heat treatment test at 240° C. for 100 hours,
the variation of bending strength calculated by $100\times(R_1-R_2)/R_1$ is 35% or less, wherein the bending strength of a sheet of the cured product prior to the heat treatment test, as measured in a 25° C. atmosphere in accordance with JIS K 6911, is defined as $R_1$, and the bending strength of the sheet of the cured product after the heat treatment test, as measured in a 25° C. atmosphere in accordance with JIS K 6911, is defined as $R_2$.

7. The phenolic resin composition according to claim 1, wherein the resorcinol resin is a novolac-type resorcinol resin.

8. The phenolic resin composition according to claim 1, wherein the phenolic resin composition has a melting point of higher than or equal to 50° C. and lower than or equal to 150° C.

9. A phenolic resin cured product obtained by heat-curing the phenolic resin composition according to claim 1.

* * * * *